(12) United States Patent
Ogasawara

(10) Patent No.: US 7,944,797 B2
(45) Date of Patent: May 17, 2011

(54) RECORDING AND REPRODUCING METHOD, RECORDING MEDIUM, AND RECORDING AND REPRODUCING APPARATUS

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 417 days.

(21) Appl. No.: 12/294,455

(22) PCT Filed: Mar. 14, 2007

(86) PCT No.: PCT/JP2007/055127
§ 371 (c)(1),
(2), (4) Date: Sep. 25, 2008

(87) PCT Pub. No.: WO2007/111139
PCT Pub. Date: Oct. 4, 2007

(65) Prior Publication Data
US 2010/0232278 A1    Sep. 16, 2010

(30) Foreign Application Priority Data

Mar. 28, 2006   (JP) ................................ 2006-087724

(51) Int. Cl.
*G11B 7/00* (2006.01)
(52) U.S. Cl. ..................................... 369/103; 369/47.22
(58) Field of Classification Search .................. None
See application file for complete search history.

(56) References Cited

U.S. PATENT DOCUMENTS

| | | | |
|---|---|---|---|
| 5,777,760 A | 7/1998 | Hays et al. | |
| 7,202,919 B2 * | 4/2007 | Edwards | 349/25 |
| 2005/0147013 A1 * | 7/2005 | Tateishi et al. | 369/103 |

FOREIGN PATENT DOCUMENTS

| | | |
|---|---|---|
| JP | 11-509954 | 8/1999 |
| JP | 2005-227704 | 8/2005 |
| JP | 2007-065138 | 3/2007 |

* cited by examiner

*Primary Examiner* — Joseph Haley
(74) *Attorney, Agent, or Firm* — Drinker Biddle & Reath LLP

(57) ABSTRACT

A recording method which optically records two-dimensional data including a positioning mark and data area in a recording medium. In this method, the state of the positioning mark is changed from a first state to at least one second state different from the first state every given number of recording times of such two-dimensional data.

19 Claims, 16 Drawing Sheets

RECORDING AND REPRODUCING METHOD, RECORDING MEDIUM, AND RECORDING AND REPRODUCING APPARATUS

TECHNICAL FIELD

The present invention relates to a method of optically recording or reproducing information and particularly to a recording medium to optically record or reproduce information into or from, and a recording and reproducing system capable of recording and reproducing two-dimensional data into and from the recording medium.

BACKGROUND ART

Optical disks are known as record media which a signal can be optically recorded or reproduced onto or from by irradiating a ray bundle. Generally, by irradiating a ray bundle and detecting reflected light, one-dimensional data are sequentially read out from a series of pits arranged in a direction along a track so as to reproduce a recorded signal.

With two-dimensional data having information in two longitudinal and transverse directions, the amount of information to be recorded is dramatically increased, and hence, for example, two-dimensional code is widely used for an image and read in by a two-dimensional image sensor to reproduce recorded data.

Meanwhile, holograms are attracting attention as record media capable of recording two-dimensional data at high densities. The characteristic of the holograms consists in recording wave fronts of light carrying information volumetrically as change in the index of refraction (a hologram) in a recording medium made of a photosensitive material. Performing multiplex recording on a hologram recording medium can dramatically increase the recording capacity. For example, as shown in FIG. 27, in an angle multiplexing scheme, by changing the relative angle between reference light and signal light with respect to a hologram recording medium, a plurality of holograms (e.g., holograms of reference light of incident angles A, B and signal light) can be recorded in the same area of the hologram recording medium 2.

A hologram apparatus of recording and reproducing into and from hologram recording media comprises, for example, a laser source to generate coherent light; a spatial modulator to spatially modulate the coherent light according to two-dimensional data, thereby generating signal light; an optical system to irradiate the coherent reference light and the coherent signal light onto a recording medium through an object lens, thereby forming a hologram inside the recording medium; and an optical system to irradiate reference light, which has an image sensor to receive and detect an image of two-dimensional data imaged by the reference light through an object lens. The image sensor is a CCD (charge-coupled device) or a photoelectric conversion device constituted by an array of CMOSs (complementary metal-oxide semiconductor devices) or the like.

When reproducing record data from recorded two-dimensional data, the quality of a read-in image, i.e., two-dimensional data is important. Accordingly, a positioning mark is contained in two-dimensional data and is displayed in the same shape and at the same place with its shape and location being fixed. For example, the same specific symbol is displayed in one or more corners or the like of the rectangular two-dimensional data.

In the hologram apparatus, the positional deviation between the center of the aperture area of the object lens receiving light and two-dimensional data recorded in a hologram recording medium is estimated based on the positioning mark in an image of the two-dimensional data read in from the hologram recording medium, and their positions are corrected such that the center of the two-dimensional data coincides with the center of the aperture area of the object lens. One example of the patterns of a reference position mark (positioning mark) is a plurality of crosses arranged on the edge of a rectangle to which the aperture area of the object lens is inscribed (refer to Japanese Patent Application Laid-Open Publication No. 2005-227704, paragraph 0055).

Because the positioning mark in the two-dimensional data is displayed at the same location and in the same shape, and because the light output of the light source of the hologram apparatus when recording into a hologram recording medium is considerably large while it depends on the sensitivity of the hologram recording medium, a burning phenomenon of the positioning mark occurs in optical components such as the object lens (including particularly the image sensor at the imaging position). This burning phenomenon occurs because the surface coats or members themselves of optical components of the apparatus absorb light energy, and the transmittance or the like thereof changes from their normal state. If the burning occurs, an image of the positioning mark reproduced and imaged on the image sensor and an image of the positioning mark due to the burning exist mixed. As a result, it becomes difficult to read in the positioning mark reproduced and thus to read reproduced data.

Patent Document 1:
Japanese Patent Application Laid-Open Publication No. 2005-227704

DISCLOSURE OF THE INVENTION

Problem to be Solved by the Invention

Accordingly, a task to be achieved by the present invention is to provide a recording and reproducing method, a recording medium, and a recording and reproducing apparatus capable of stably recording or reproducing with preventing the occurrence of the burning.

Means for Solving the Problem

According to the present invention, there is provided a recording method of optically recording two-dimensional data including a positioning mark and data area in a recording medium. The state of the positioning mark is changed from a first state to at least one second state different from the first state every given number of recording times of such two-dimensional data.

According to the present invention, there is provided a reproducing method of optically reproducing two-dimensional data including a positioning mark and data area from a recording medium. The state of the positioning mark is changed from a first state to at least one second state different from the first state every equal number of reproducing times to the given number of recording times of the two-dimensional data.

According to the present invention, there is provided a recording apparatus of optically recording two-dimensional data including a positioning mark and data area in a recording medium. The recording apparatus comprises recording means to change the state of the positioning mark from a first state to at least one second state different from the first state every given number of recording times of such two-dimensional data; and recording control means to control the recording means.

According to the present invention, there is provided a reproducing apparatus of optically reproducing two-dimensional data including a positioning mark and data area from a recording medium. The reproducing apparatus comprises reproducing means to change the state of the positioning mark from a first state to at least one second state different from the first state every equal number of reproducing times to the given number of recording times of the two-dimensional data; and reproducing control means to control the reproducing means.

According to the present invention, there is provided a recording medium in which two-dimensional data including a positioning mark and data area is optically recorded in and reproduced from. Identification data is recorded which includes the information that the state of the positioning mark is changed from a first state to at least one second state different from the first state every equal number of reproducing times to the given number of recording times of the two-dimensional data.

With the above configuration, in order to prevent the positioning mark from being fixed in location or shape, at least one of the location and shape of the positioning mark is changed based on the identification data at regular time intervals.

EXPLANATION OF REFERENCE NUMERALS

Figure 1:
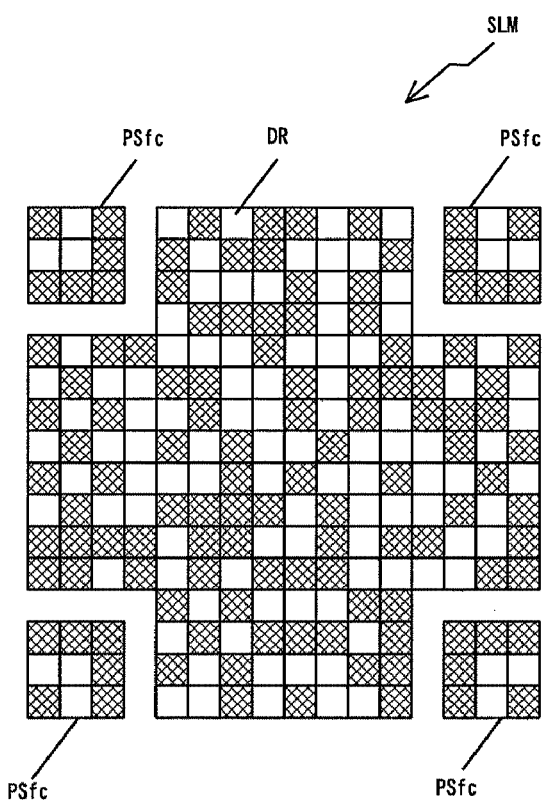
FIG. 1 is a front view of a spatial light modulator of a recording apparatus that records two-dimensional data as a hologram as seen in an optical axis direction according to an embodiment of the present invention.

2: Hologram recording medium
3: Substrate
5: Reflective layer
6: Separation layer
7: Hologram recording layer
8: Protective layer
22: Spindle motor
23: Pickup
24: Pickup driving unit
25: Light source drive circuit 26: Spatial light modulator drive circuit
27: Reproduced light signal detecting circuit
28: Servo signal processing circuit
29: Focus servo circuit
30: XY-direction movement servo circuit
31: Pickup position detecting circuit
32: Slider servo circuit
33: Rotational number detecting unit
34: Rotational position detecting circuit
35: Spindle servo circuit
36: Object lens driving unit
37: Control circuit
LCP: Polarizing liquid crystal panel
PLCCR: Center polarizing area
PLCPR: Annular polarizing area
SLM: Spatial light modulator
LCCR: Center area
LCPR: Annular area
OBM: Object lens module
CR: Center area
PR: Annular area
$1/4\lambda$: Quarter-wavelength plate
AS: Coupling lens
CL1: Collimator lens
IS: Image sensor
CODD: signal detecting dual photo-detector device
DOE: Diffractive optical element
HG: Hologram
LD1: Laser source
LD2: Servo laser source
ML: Imaging lens
OB: Object lens
PBS: Polarizing beam splitter
PD: Photo-detector
RB: reference light
SB: signal light

DETAILED DESCRIPTION OF THE INVENTION

Embodiments of the present invention will be described below with reference to the drawings.
<Recording Method>
First, a recording method in a recording apparatus that optically records two-dimensional data into a recording medium will be described. The two-dimensional data includes data (a positioning mark) used for positioning two-dimensional data that is reproduced and data (a data area) indicating arbitrary information to be recorded which the user wants to. As opposed to the user's arbitrary information, the positioning mark should be determined in the recording and reproducing standard for the recording apparatus and the recording media. Thus, while the positioning mark is recorded into the recording media, data of a predetermined algorithm based on the positioning mark is recorded beforehand in at least one of the recording apparatus and the recording medium, and recording is performed according to the positioning mark.

Figure 2:
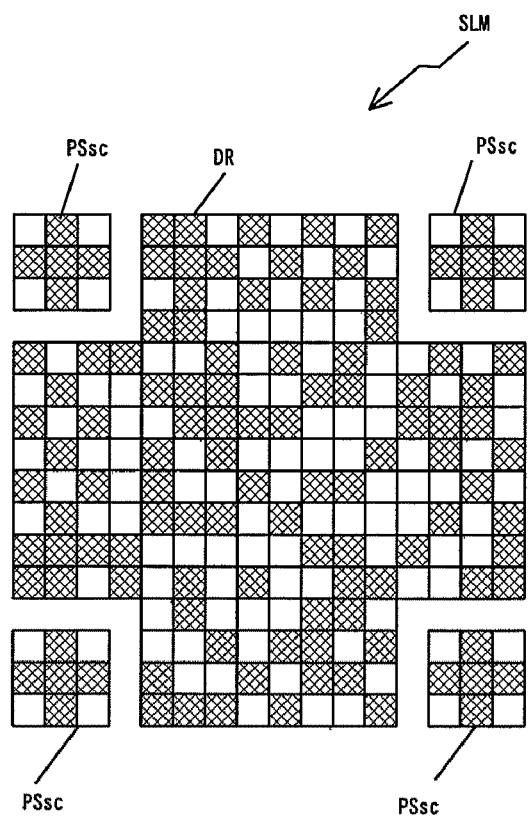
FIG. 2 is a front view of the spatial light modulator of the recording apparatus that records two-dimensional data as a hologram as seen in the optical axis direction according to the embodiment of the present invention.

FIGS. 1, 2 show a spatial light modulator SLM in the recording apparatus that records the two-dimensional data as a hologram. A bright and dark dot pattern is displayed by on and off (bright and dark) voltage application to each cell and is a transparent and non-transparent pattern. In one recording step, the spatial light modulator SLM displays the positioning mark in such a way that the state (e.g., shape or pattern) of the positioning mark is changed from a first state PSfc to a second different state PSsc alternately at given time intervals (i.e., every given number of times, such as every time, every twice, every three times, every four times, ... ). In a data area DR, arbitrary information is displayed each recording time. The transmissive spatial light modulator SLM is, for example, a liquid crystal panel with analyzers that has a plurality of pixel electrodes divided in a matrix, which has a function to electrically block part of the incident light on a per pixel basis or transmit all the incident light for a non-modulated state, is connected to a spatial light modulator drive circuit (not shown), and modulates and transmits the ray bundle so as to have a distribution based on to-be-recorded page data (an information pattern of two-dimensional data such as a bright and dark dot pattern on a plane), thereby producing signal light. Instead of the transmissive one, a reflective liquid crystal panel or DMD can be used as the spatial light modulator.

In the recording step, synchronization is made by the positioning mark PSfc, PSsc reproduced from the recording medium every given number of times matching (in pattern) the positioning mark stored in memory of the apparatus, in order to perform recording and reproducing. A combination of the type, shape, and position of the positioning mark and change timings is stored in the memory of the apparatus beforehand.

In either of the recording and reproducing, the positioning mark PSfc, PSsc reproduced every given number of times needs to match the positioning mark read in from the recording medium beforehand and stored in the memory of the apparatus for the recording and reproducing to be performed. In this case, identification data including the information that the state of the positioning mark was changed from the first state to the second state every given number of recording times of such two-dimensional data is recorded, e.g., as part of address data in the recording medium. By this means, pattern match is secured in the subsequent steps. The identification data may be contained in the data area DR. The identification data may be recorded into memory added to the recording medium, the memory of the apparatus, or the like instead of or in addition to the recording medium.

Figure 3:
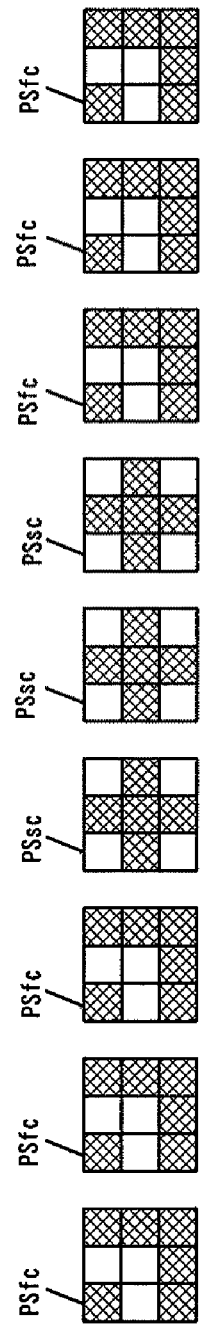
FIG. 3 is a diagram for explaining identification data by showing a series of shapes between which a positioning mark in the spatial light modulator changes, according to the embodiment of the present invention.

The above example shows the case where the state of the positioning mark is changed from the first state to the second state alternately, but not being limited to the positioning mark having two states, the identification data recorded in the recording medium and in the apparatus can contain timing data indicating the equal numbers of times that the PSfc and PSsc appear respectively before one state changes to the other as shown in FIG. 3 (in the figure, from left, every three times up to nine recording times). The numbers of recording times of the PSfc and PSsc may not be equal but be, for example, two for PSfc and three for PSsc as long as being regular.

Figure 4:
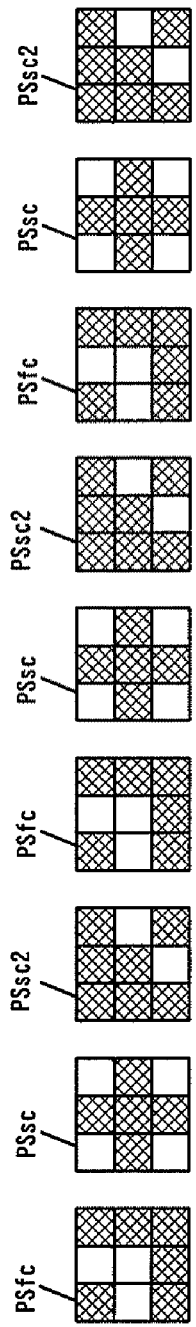
FIG. 4 is a diagram for explaining the identification data by showing a series of shapes between which the positioning mark in the spatial light modulator changes, according to another embodiment of the present invention.

Alternatively, the identification data recorded in the recording medium and in the apparatus can contain timing data and form data indicating the numbers of times that two or more positioning marks PSfc, PSsc, PSsc2 appear as shown in FIG. 4, one number each for the marks (in the figure, from left, sets of three different patterns once each up to nine recording times). Further, the state of the positioning mark may be different each time in predetermined order.

Further, the identification data can contain form data indicating first and second states of the positioning mark and timing data indicating such given numbers of recording times that the average brightness over time is equal for the first and second states of the positioning mark (the number of ONs or OFFs of each cell over the recording times is equal for all the cells) as shown in FIG. 4. By this means, the effect of preventing the burning is improved.

Figure 5:
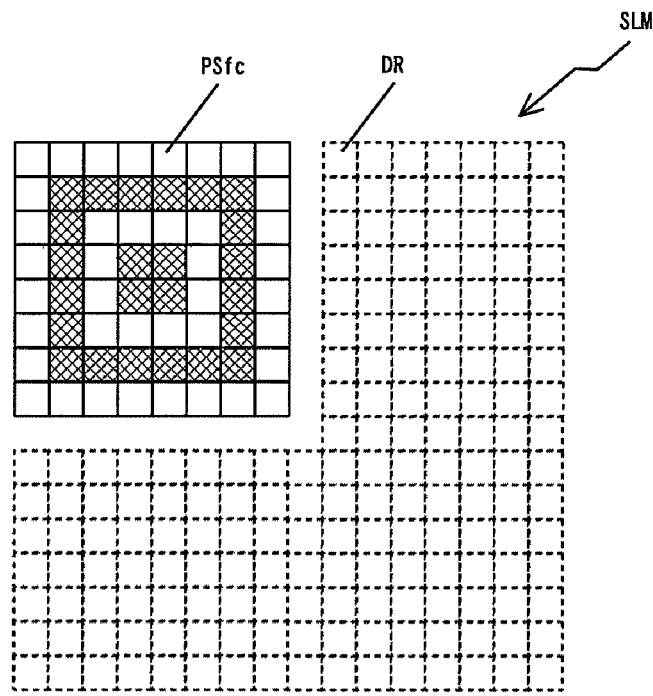
FIG. 5 is an enlarged front view of a positioning mark in the spatial light modulator according to another embodiment of the present invention.
Figure 6:
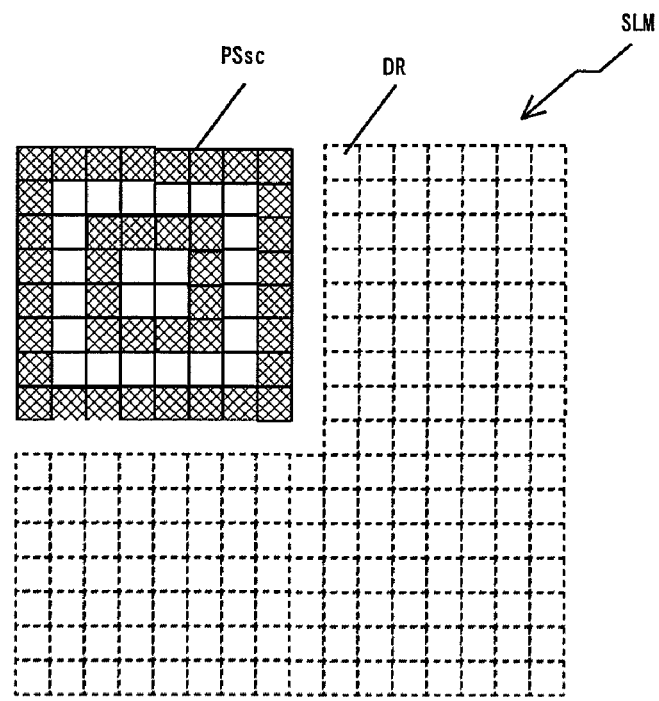
FIG. 6 is an enlarged front view of a positioning mark in the spatial light modulator according to another embodiment of the present invention.
Figure 7:
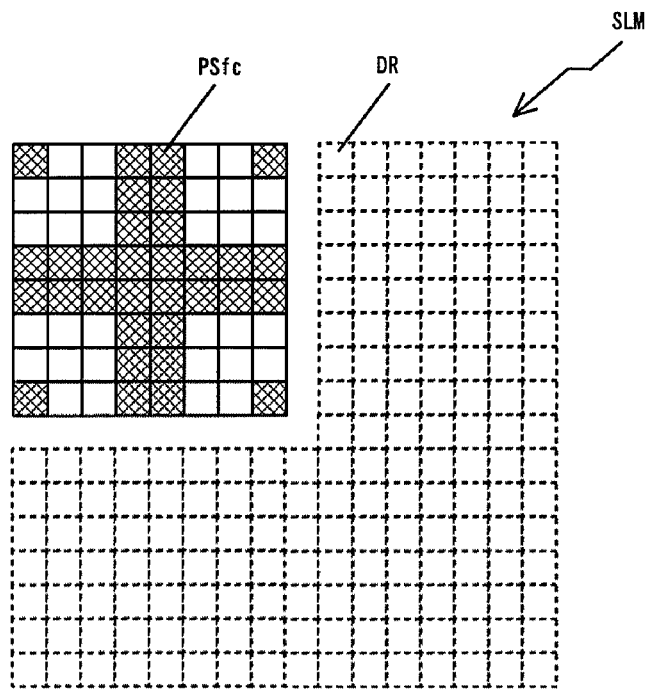
FIG. 7 is an enlarged front view of a positioning mark in the spatial light modulator according to another embodiment of the present invention.
Figure 8:
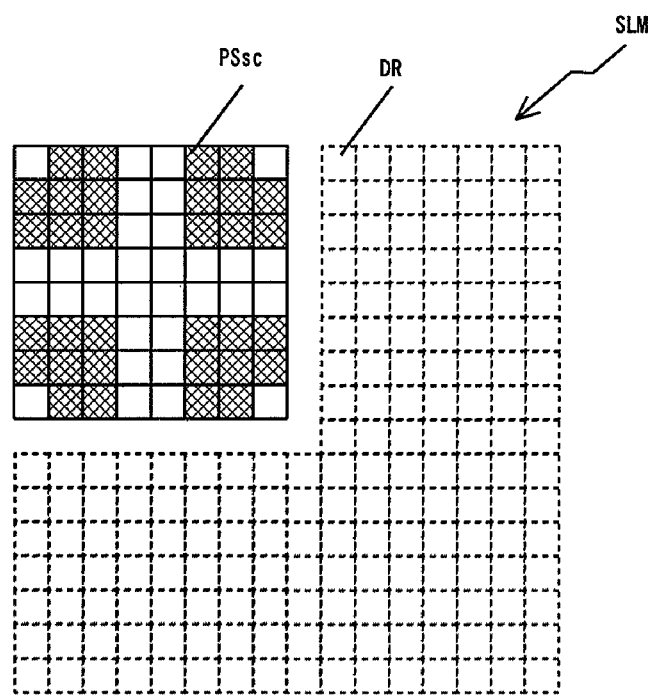
FIG. 8 is an enlarged front view of a positioning mark in the spatial light modulator according to another embodiment of the present invention.

An example of the change between the first and second states of the positioning mark is that the positioning mark is inverted in negative and positive between the PSfc and PSsc every given number of recording times as shown in FIGS. 5, 6. As shown in FIGS. 7, 8, in addition to the negative and positive inversion, the average brightness may be made equal for the first and second states (the number of ONs or OFFs of the cells is equal for the PSfc and PSsc). By this means, the effect of preventing the burning is improved.

Figure 9:
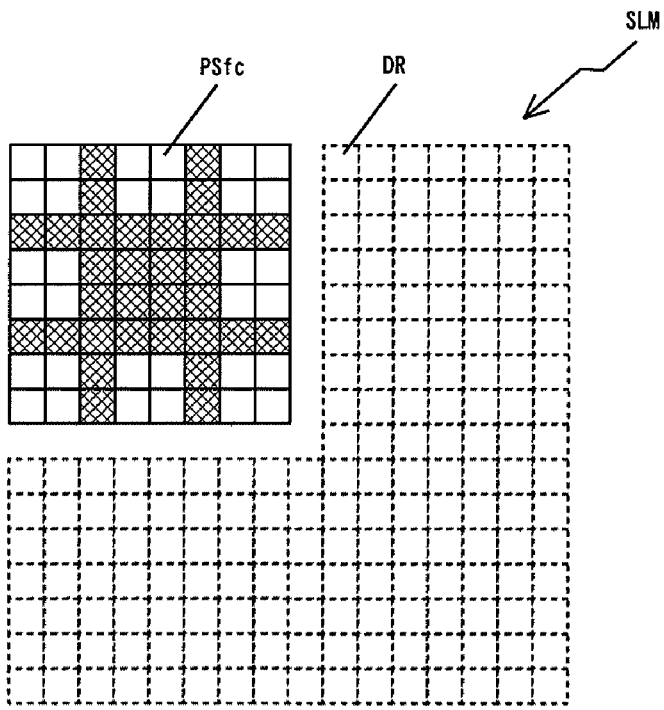
FIG. 9 is an enlarged front view of a positioning mark in the spatial light modulator according to another embodiment of the present invention.
Figure 10:
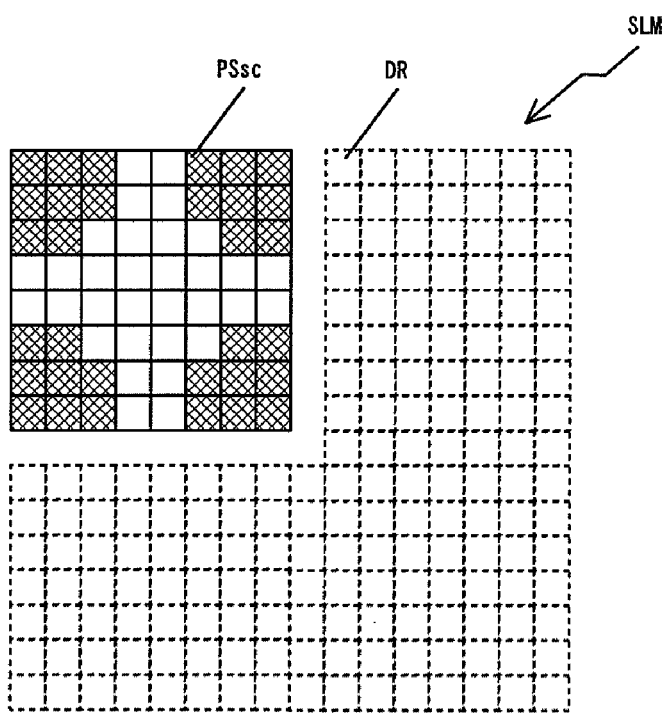
FIG. 10 is an enlarged front view of a positioning mark in the spatial light modulator according to another embodiment of the present invention.

As shown in FIGS. 9, 10, the positioning mark may be different in shape between the PSfc and PSsc, and by making the average brightness equal for the first and second states, the burning is further prevented.

Figure 11:
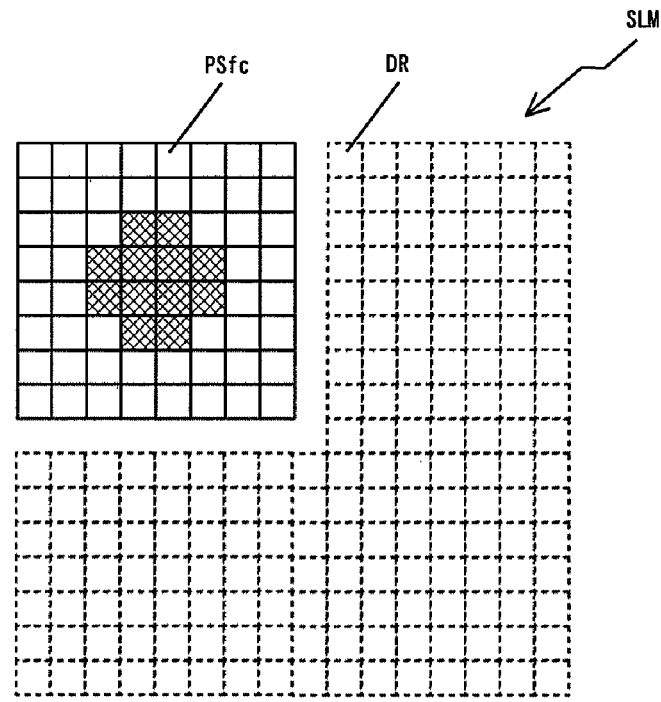
FIG. 11 is an enlarged front view of a positioning mark in the spatial light modulator according to another embodiment of the present invention.
Figure 12:
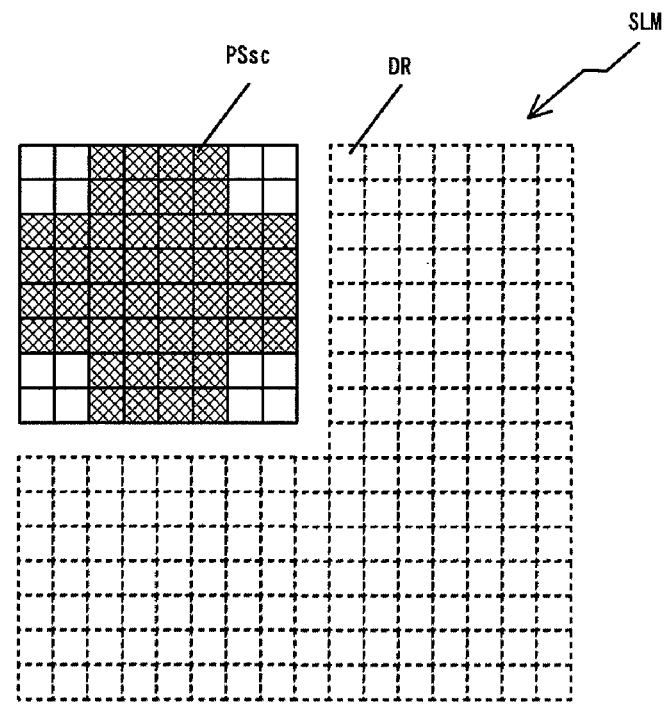
FIG. 12 is an enlarged front view of a positioning mark in the spatial light modulator according to another embodiment of the present invention.

As shown in FIGS. 11, 12, the first and second states of the positioning mark may be made similar in shape but different in size.

Figure 13:
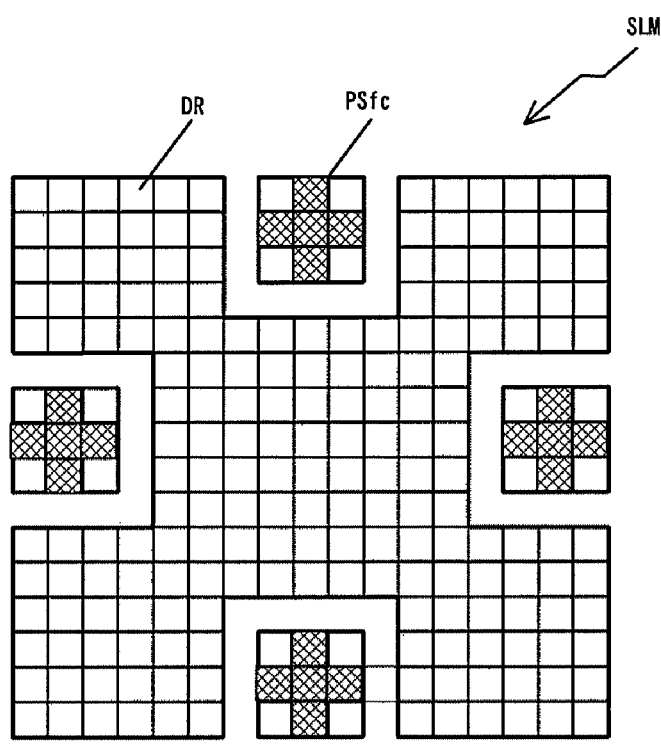
FIG. 13 is an enlarged front view of a positioning mark in the spatial light modulator according to another embodiment of the present invention.
Figure 14:
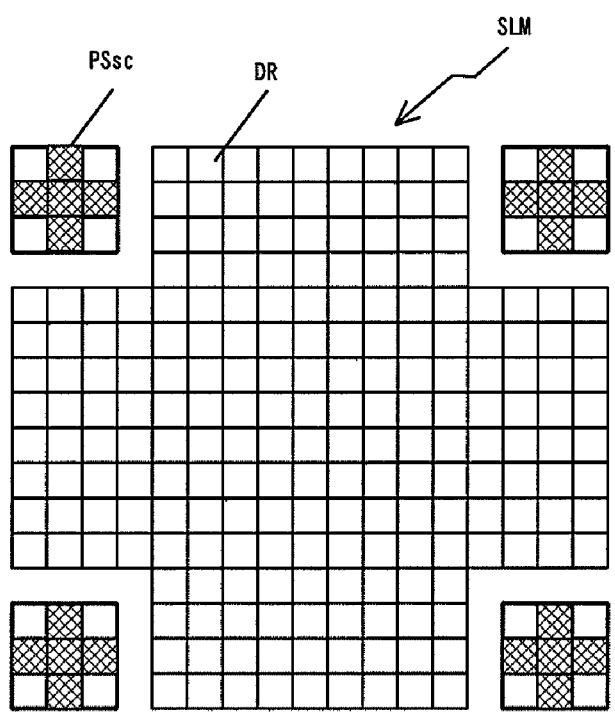
FIG. 14 is an enlarged front view of a positioning mark in the spatial light modulator according to another embodiment of the present invention.

As shown in FIGS. 13, 14, in the spatial light modulator SLM, i.e., the two-dimensional data, the first and second states PSfc, PSsc of the positioning mark may be located at different locations. Here, although the first and second states PSfc, PSsc of the positioning mark can be made the same in shape, they may be different.

Figure 15:
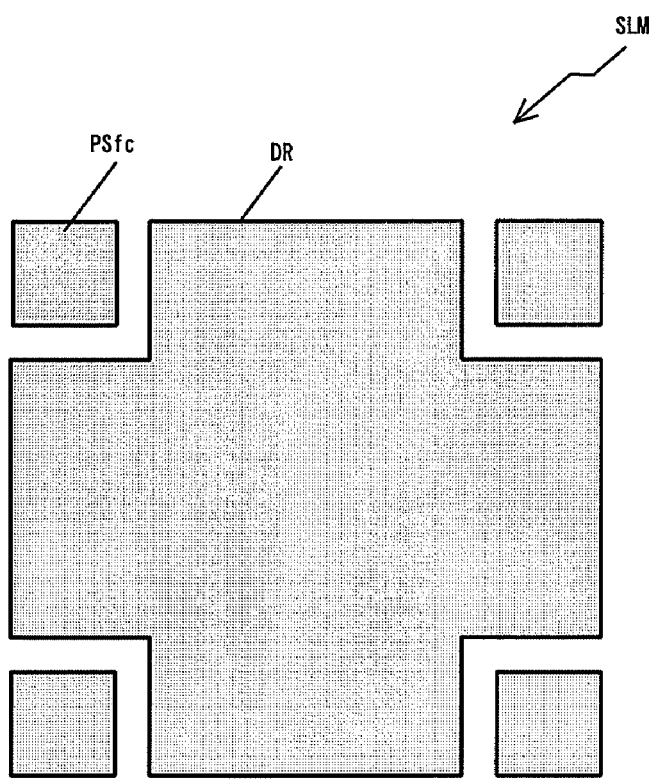
FIG. 15 is an enlarged front view of a positioning mark in the spatial light modulator according to another embodiment of the present invention.
Figure 16:
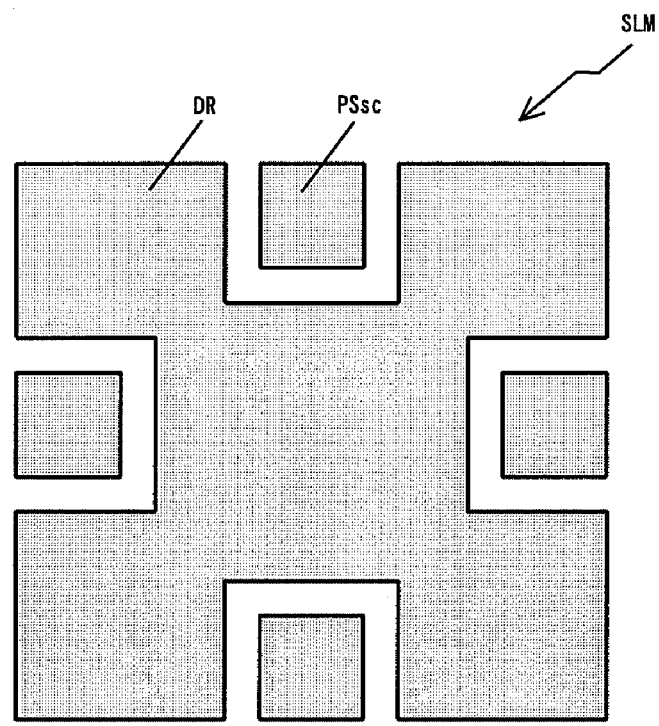
FIG. 16 is an enlarged front view of a positioning mark in the spatial light modulator according to another embodiment of the present invention.
Figure 17:
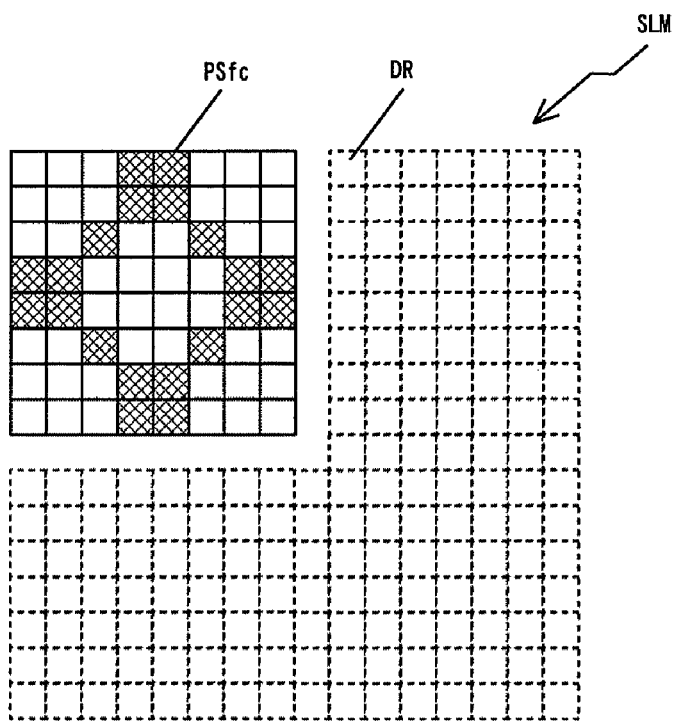
FIG. 17 is an enlarged front view of a positioning mark in the spatial light modulator according to another embodiment of the present invention.
Figure 18:
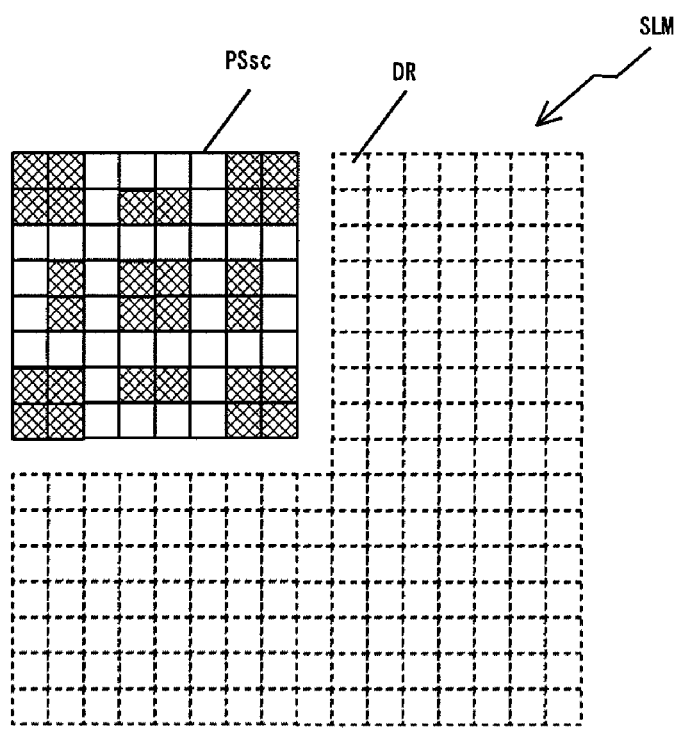
FIG. 18 is an enlarged front view of a positioning mark in the spatial light modulator according to another embodiment of the present invention.
Figure 19:
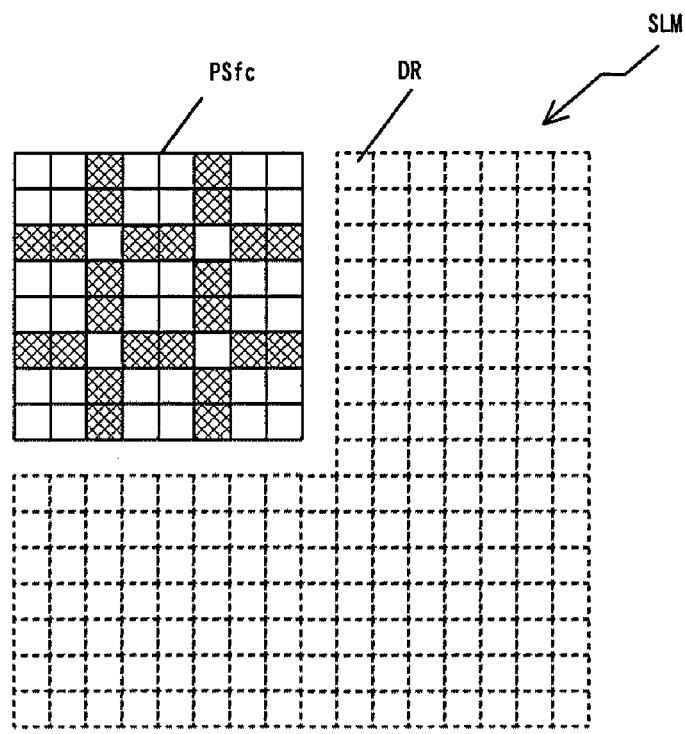
FIG. 19 is an enlarged front view of a positioning mark in the spatial light modulator according to another embodiment of the present invention.
Figure 20:
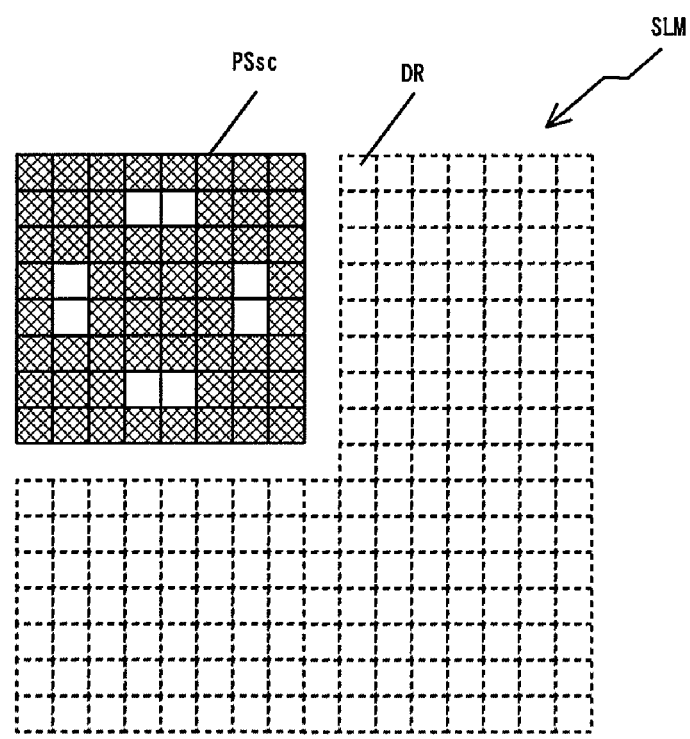
FIG. 20 is an enlarged front view of a positioning mark in the spatial light modulator according to another embodiment of the present invention.

As shown in FIGS. 15, 16, in any of the above embodiments, the average brightness may be made equal for the data area DR and the positioning mark PSfc, PSsc. By this means, the effect of preventing the burning is improved.

As shown in FIGS. 17-20, by changing the positioning mark between PSfc, PSs3, PSs4, and PSs5 evenly regularly every given number of times, the average brightness over time can be made equal. By this means, the effect of preventing the burning is improved.

<Reproducing Method>

Where a hologram reproduced signal from the hologram recording medium having data recorded therein is demodulated in the two-dimensional image sensor, the two-dimensional data containing the positioning mark together with desired data is displayed by the spatial light modulator SLM and recorded into the hologram recording medium. In the present embodiment, the positioning mark is changed in shape and display location at given time intervals. The way to change the shape and location of the positioning mark is selected from display patterns or locations of the positioning mark (identification data) stored beforehand in memory of the apparatus according to the time interval. That is, in the reproducing method, the state of the positioning mark is changed from a first state to at least one second state different from the first state every equal number of reproducing times to the given number of recording times of the two-dimensional data.

In the present embodiment, for example, the identification data may be recorded beforehand as part of address data in the hologram recording medium and read out and stored in the memory of the apparatus, from which the data is selected. That is, the identification data is read in from the recording medium, and the state of the positioning mark is changed from a first state to at least one second state different from the first state every given number of reproducing times of the two-dimensional data according to the identification data.

Address data is reproduced from pre-pit information recorded beforehand in the hologram recording medium 2, and the shape and location of the positioning mark are changed according to ones selected from display patterns or locations of the positioning mark, stored beforehand in the memory of the apparatus, based on the address data. Also in reproducing holograms, after the address data is read in, the location data of the positioning mark is loaded from the memory of the apparatus based on the address data and is used in pattern matching of the positioning mark, etc.

<Hologram Apparatus>

A hologram apparatus as a hologram recording and reproducing system that records and reproduces information into and from a disk-shaped hologram recording medium according to an embodiment of the invention will be described. The present embodiment is not restricted to the configuration of this hologram apparatus but is applicable to any hologram recording implementation.

Figure 21:
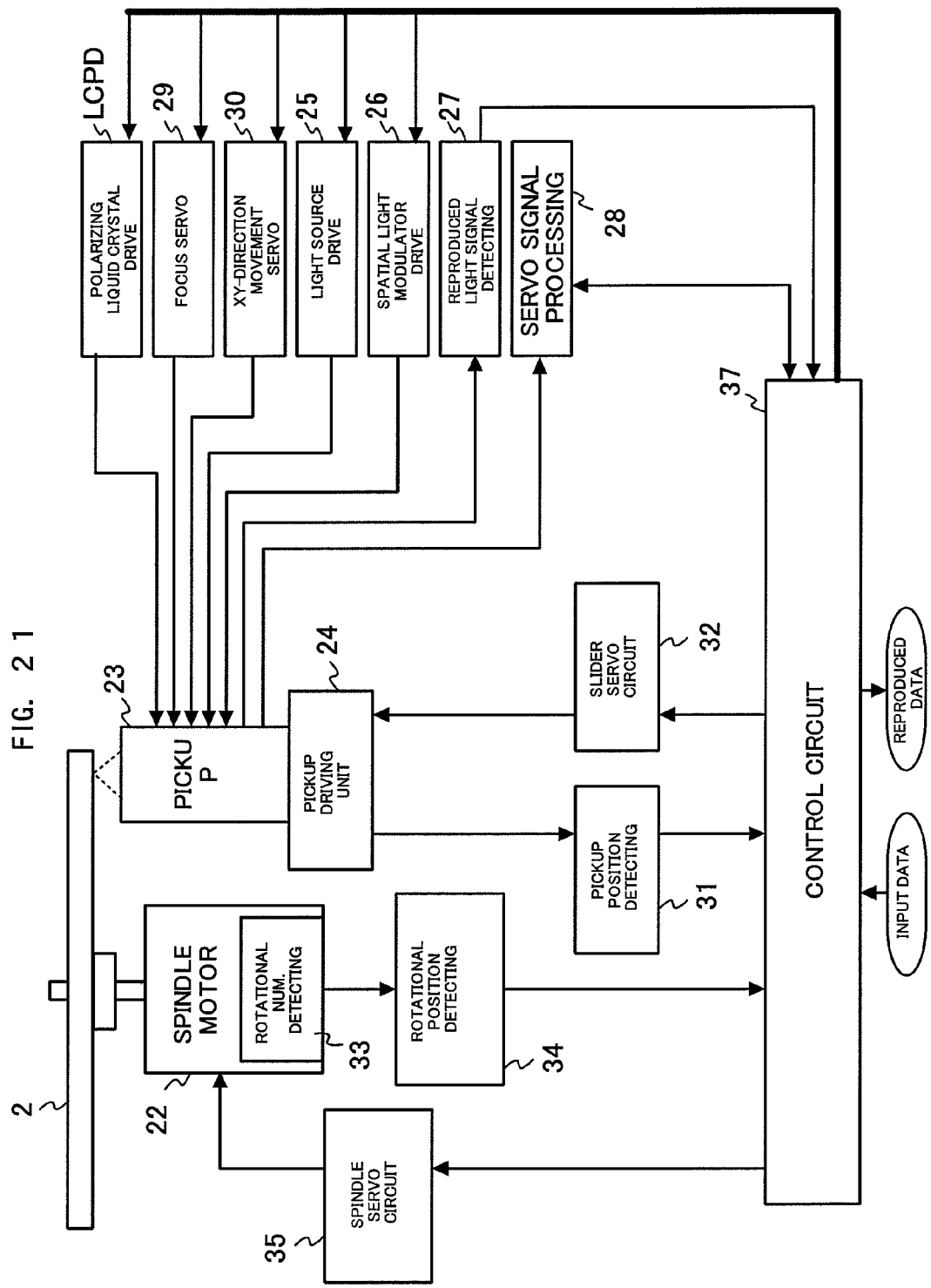
FIG. 21 is a block diagram showing schematically the configuration of a hologram apparatus according to the embodiment of the present invention.

FIG. 21 is a block diagram showing an example of the hologram apparatus.

The hologram apparatus comprises a spindle motor 22 to rotate a disk of a hologram recording medium 2 on a turntable, a pickup 23 to read out a signal in the form of a ray bundle from the hologram recording medium 2, a pickup driving unit 24 to hold and move the pickup in a radial direction (x-direction), a light source drive circuit 25, a spatial light modulator drive circuit 26, a reproduced light signal detecting circuit 27, a servo signal processing circuit 28, a focus servo circuit 29, an xy-direction movement servo circuit 30, a pickup position detecting circuit 31 connected to the pickup driving unit 24 to detect a position signal of the pickup, a slider servo circuit 32 connected to the pickup driving unit 24 to supply a predetermined signal thereto, a rotational number detecting unit 33 connected to the spindle motor 22 to detect a rotational number signal of the spindle motor 22, a rotational position detecting circuit 34 connected to the rotational number detecting unit to produce a rotational position signal of the hologram recording medium 2, a polarizing liquid crystal drive circuit LCPD, and a spindle servo circuit 35 connected to the spindle motor 22 to supply a predetermined signal thereto.

The hologram apparatus has a control circuit 37, which is connected to the light source drive circuit 25, the spatial light modulator drive circuit 26, the reproduced light signal detecting circuit 27, the servo signal processing circuit 28, the focus servo circuit 29, the xy-direction movement servo circuit 30, the pickup position detecting circuit 31, the slider servo circuit 32, the rotational number detecting unit 33, the rotational position detecting circuit 34, the polarizing liquid crystal drive circuit LCPD, and the spindle servo circuit 35. The control circuit 37 performs focus servo control, x- and y-direction movement servo control, reproducing position (x- and y-direction position) control, and the like for the pickup via these drive circuits based on signals from these circuits. The control circuit 37 is constituted by a microcomputer incorporating various memories, controls the entire apparatus, and generates various control signals according to operation inputs by a user through an operation unit (not shown) and to the current operating status of the apparatus. Further, the control circuit 37 is connected to a display unit (not shown) to display the operating status and the like for the user.

The light source drive circuit 25 connected to a hologram recording and reproducing laser source LD1 adjusts the output of the laser source LD1 so as to make the intensity of both ray bundles emitted strong when hologram recording and weak when reproducing.

The control circuit 37 performs processes such as the encoding of externally inputted data to be hologram recorded and supplies signals to the spatial light modulator drive circuit 26 to control the hologram recording sequence. The control circuit 37 performs demodulation and error correction on a signal from the reproduced light signal detecting circuit 27, thereby retrieving data recorded in the hologram recording medium. Further, the control circuit 37 decodes the retrieved data, thereby reproducing two-dimensional data to output it as reproduced two-dimensional data.

Moreover, the control circuit 37 controls such that holograms to be recorded are formed at predetermined intervals so that the holograms can be recorded at the predetermined intervals (multiplex recording).

The servo signal processing circuit 28 generates from a focus error signal a focusing drive signal, which is supplied to the focus servo circuit 29 via the control circuit 37. The focus servo circuit 29 drives the focusing part of an object lens driving unit 36 (see FIG. 23) mounted on the pickup 23 according to the drive signal, and the focusing part operates to adjust the focal position of the light spot irradiated into the hologram recording medium.

Furthermore, the servo signal processing circuit 28 generates x- and y-direction movement drive signals, which are supplied to the xy-direction movement servo circuit 30. The xy-direction movement servo circuit 30 drives the object lens driving unit 36 (see FIG. 23) mounted on the pickup 23 according to the x- and y-direction movement drive signals. Hence, the object lens is driven by amounts corresponding to drive currents according to the x-, y-, and z-direction drive signals, and thus the position of the light spot irradiated into the hologram recording medium is displaced. By this means, the position of the light spot relative to the hologram recording medium in motion when recording can be made constant to secure a hologram forming time.

The control circuit 37 generates a slider drive signal based on the position signal from the operation unit or the pickup position detecting circuit 31 and an x-direction movement error signal from the servo signal processing circuit 28 and supplies this to the slider servo circuit 32. The slider servo circuit 32 moves the pickup 23 in a disk radial direction via the pickup driving unit 24 by an amount corresponding to a drive current according to the slider drive signal.

The rotational number detecting unit 33 detects a frequency signal indicating the current rotational frequency of the spindle motor 22 rotating the hologram recording medium 2 on the turntable and generates a rotational number signal indicating the spindle rotational number corresponding thereto to supply it to the rotational position detecting circuit 34. The rotational position detecting circuit 34 generates a rotational position signal to supply it to the control circuit 37. The control circuit 37 generates a spindle drive signal, supplies it to the spindle servo circuit 35 to control the spindle motor 22, thereby rotationally driving the hologram recording medium 2.

<Optical Pickup>

Figure 22:
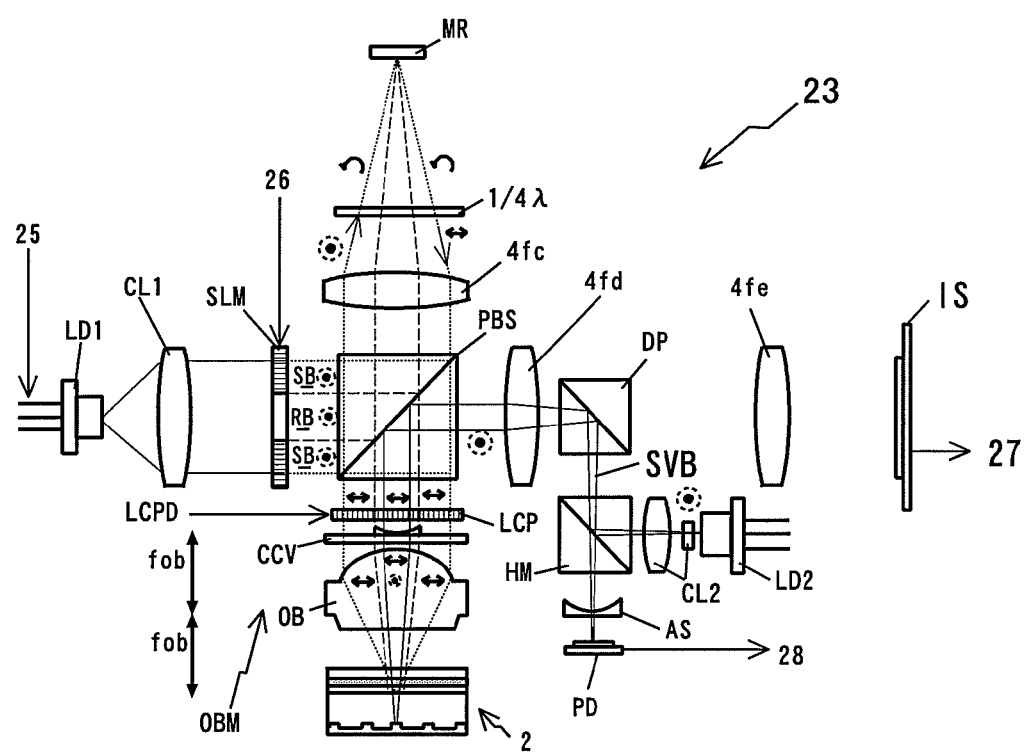
FIG. 22 is a configuration diagram showing schematically a pickup of the hologram apparatus recording and reproducing information into and from a hologram recording medium according to the embodiment of the present invention.

FIG. 22 shows schematically the configuration of the pickup 23. The present embodiment is not restricted to this pickup configuration but is applicable to any hologram recording implementation.

The pickup 23 comprises a hologram recording optical system, a hologram reproducing optical system, and a servo control system. These systems are arranged in a housing (not shown) except an object lens module OBM and drive systems thereof. The hologram recording and reproducing laser source LD1, a collimator lens CL1, the spatial light modulator SLM, a polarizing beam splitter PBS, 4$f$ lenses fd, fe, and an image sensor IS are arranged in a line, and a mirror MR, a quarter-wavelength plate 1/4$\lambda$, a 4$f$ lens fc, the polarizing beam splitter PBS, a polarizing liquid crystal panel LCP, and the object lens module OBM are arranged in a line. The two lines of components are placed orthogonal to each other at the polarizing beam splitter PBS.

<Hologram Recording Optical System>

The hologram recording optical system comprises the hologram recording and reproducing laser source LD1, the collimator lens CL1, the transmissive spatial light modulator SLM, the polarizing beam splitter PBS, the polarizing liquid crystal panel LCP, the 4$f$ lens fc, the mirror MR, the quarter-wavelength plate 1/4$\lambda$, and the object lens module OBM.

The emitted light from the laser source LD1 is made by the collimator lens CL1 to be parallel ray light, which is incident on the spatial light modulator SLM and then on the polarizing beam splitter PBS. The polarization direction of the parallel ray light is assumed to be perpendicular to the plane of the page (broken line circles with a filled circle inside in FIG. 22). The spatial light modulator SLM that displays page data to be recorded in its center area makes a ray bundle passing through the center area including the optical axis be non-modulated reference light RB and an annular ray bundle passing through the periphery around it be signal light SB. The polarizing beam splitter PBS is placed to reflect both the reference light RB and signal light SB spatially separated and incident thereon by its polarizing film so as to be incident on the 4$f$ lens fc. This 4$f$ lens fc is a lens for imaging an image at a focal position of the object lens OB (focal distance fob on the optical axis). Because it is difficult to place the spatial light modulator SLM at the focal position of the object lens OB, the distance from the spatial light modulator SLM to the 4$f$ lens fc is set equal to the focal distance of the 4$f$ lens fc. The 4$f$ lens fc is placed such that the ray bundle incident thereon passes through the quarter-wavelength plate 1/4$\lambda$ to be circularly polarized (counterclockwise arrows in FIG. 22) and then reflected by the mirror MR to be incident on the quarter-wavelength plate 1/4$\lambda$ again. As a result, the reference light RB and signal light SB from the quarter-wavelength plate 1/4$\lambda$ have a polarization direction parallel to the plane of the page (a double arrow in FIG. 22) and are incident on the polarizing beam splitter PBS again. Because their polarization direction is horizontal in the plane, they pass through the polarizing beam splitter PBS. The reference light RB and signal light SB image an image at a focal position of the 4$f$ lens fc, which is equivalent to the spatial light modulator SLM existing at this imaging position. The polarizing liquid crystal panel LCP is placed at this focal position, and in addition the focal position of the object lens OB of the object lens module OBM is made to coincide with this focal position. The polarizing liquid crystal panel LCP is of a TN type in orientation.

Figure 23:
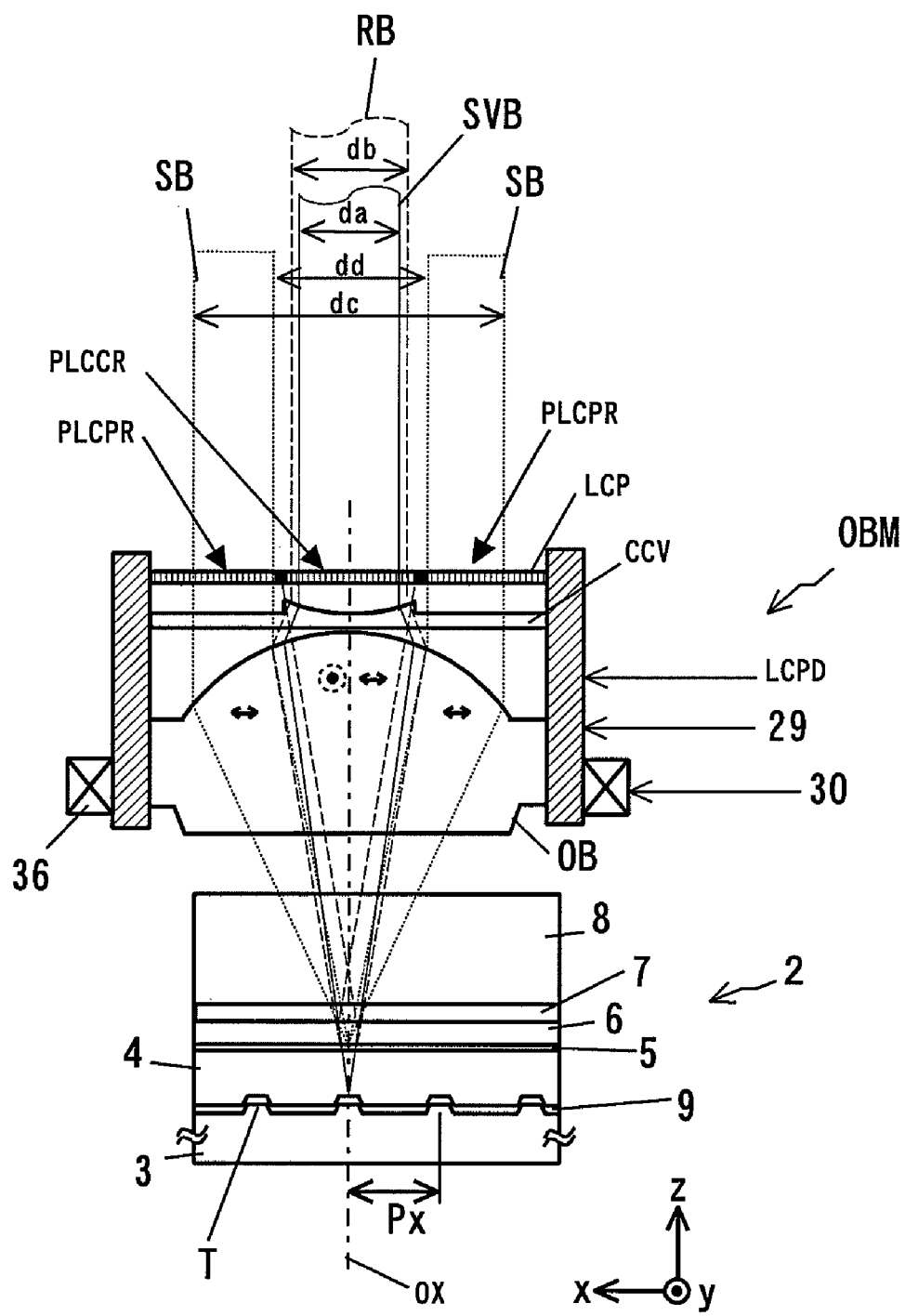
FIG. 23 is a sectional view showing schematically a hologram recording medium and an object lens module of the pickup of the hologram apparatus recording and reproducing information into and from the hologram recording medium according to the embodiment of the present invention.

As shown in FIG. 23, a concave lens element CCV is placed in the object lens module OBM on the optical axis OX so as to perform concave lens action on only the reference light RB to make the reference light RB focused on a focal point further than the original focal point of the object lens OB in cooperation with the action of the object lens OB, while the signal light SB not subjected to the concave lens action is focused on the focal point of the object lens OB. The position of the object lens module OBM relative to the hologram recording medium 2 is controlled such that the focal point of the object lens OB for the signal light SB is located on a wavelength-selective reflective film 5 of the hologram recording medium 2.

<Hologram Reproducing Optical System>

The hologram reproducing optical system, as shown in FIG. 22, comprises the hologram recording and reproducing laser source LD1, the collimator lens CL1, the spatial light modulator SLM, the polarizing beam splitter PBS, the polarizing liquid crystal panel LCP, the object lens module OBM, the 4$f$ lenses fc, fd, and fe, the mirror MR, the quarter-wavelength plate 1/4$\lambda$, and the image sensor IS. In this optical system, the optical components are common with the above hologram recording optical system except the 4$f$ lenses fd, fe and the image sensor IS.

As shown in FIG. 22, the 4$f$ lens fd of the hologram reproducing optical system is placed at such a position that its focal point coincides with the focal position of the object lens OB via the polarizing beam splitter PBS. Further, the 4$f$ lens fe having the same focal distance as the 4$f$ lens fd is placed on the optical axis at twice its focal distance from the 4f lens fd, and these form a so-called 4f optical system. Because it is difficult to place the image sensor IS at the focal position of the object lens OB at which a reproduced image by the reproduced light from the hologram recording medium 2 is imaged, the image sensor IS receiving the reproduced light is placed such that its photoreception surface is located at the focal point of the 4f lens fe, and a reproduced image is imaged on the photoreception surface of the image sensor IS, thereby obtaining a reproduced signal. By demodulating this, the recorded signal can be reproduced.

<Hologram Recording Medium>

The hologram recording medium 2, as shown in FIG. 23, comprises a protective layer 8, a hologram recording layer 7, a separation layer 6, the wavelength-selective reflective film 5, a second separation layer 4, a servo layer 9, and a substrate 3 having addresses and track structures transferred thereon. This wavelength-selective reflective film 5 is constituted by a dielectric laminated body or the like transmitting a servo beam SVB and being reflective for only a wavelength band including the wavelength of the reference light and signal light. The servo layer 9 has formed therein servo grooves or pits as multiple tracks extending separately without intersecting, called servo marks T. The pitch Px (so-called track pitch) of the servo marks T of the servo layer 9 is set at a distance predetermined by the degree of multiplexing of holograms HG to be recorded above the spot of the reference light and signal light. The width of the servo marks T is set according to the output, e.g., a push-pull signal of a photo-detector receiving reflected light from the light spot of the servo beam SVB. Positioning (focus servo and xy-direction servo) relative to the hologram recording medium 2 is performed for hologram recording and reproducing so that the servo beam SVB follows the servo mark T of the servo layer 9 of the hologram recording medium 2 as shown in FIG. 23. The focus servo and tracking servo can be performed by reproducing a guide track signal from grooves, pits, or the like recorded beforehand.

<Servo Control System>

The servo control system is for servo controlling (moving in xyz-directions) the object lens module OBM relative to the hologram recording medium 2 and, as shown in FIG. 22, comprises a servo laser source LD2 emitting the servo beam SVB, an adjusting lens CL2, a half mirror MR, a dichroic prism DP, the polarizing beam splitter PBS, the object lens module OBM, a coupling lens AS, and a photo-detector PD.

The servo laser source LD2 has a wavelength (the servo beam SVB) different from that of the recording and reproducing laser. The servo beam SVB is light of a wavelength to which the hologram recording layer 7 is non-sensitive, the wavelength being outside the sensitive wavelength band including that of the signal light and reference light.

The servo control system is coupled to the hologram reproducing optical system via the dichroic prism DP interposed between the 4f lenses fc and fe of the 4f optical system. That is, the servo laser source LD2, the adjusting lens CL2, the half mirror MR, and the dichroic prism DP are placed such that the servo beam SVB from the servo laser source LD2 is reflected by the half mirror MR, then reflected by the dichroic prism DP, and is combined with the ray bundle of the reproducing optical system. The adjusting lens CL2 is arranged, in cooperation with the detecting system 4f lens 4fd, to make the servo beam SVB become parallel ray light before entering the object lens module OBM.

As shown in FIG. 23, in the object lens module OBM the diameter (da) of the servo beam SVB is set to be no greater than the diameter (db) of the ray bundle of the reference light RB. Thus, the outer diameter (dc) and inner diameter (dd) of the signal light SB and these diameters have the relationship that dc>dd>db³ da. Here, by making the recording guide structures broader in recording interval (multiplexing interval) and the track pitch than those of usual optical disks, the aberration of the servo beam SVB and the smaller numerical aperture NA due to the diameter of the servo beam SVB being smaller do not much affect the reading.

As shown in FIG. 22, because the polarization direction of the servo beam SVB is set to be perpendicular to the plane of the page, the servo beam SVB is incident on the object lens module OBM without being affected by the action of the polarizing liquid crystal panel LCP.

As shown in FIG. 23, the combination of the concave lens element CCV and the object lens OB of the object lens module OBM is configured such that in the hologram recording medium 2 the servo beam SVB is focused further than the wavelength-selective reflective film 5, that is, it passes through the wavelength-selective reflective film 5 and is focused on the servo layer 9 having the servo marks T formed therein. Further, the combination of the concave lens element CCV and the object lens OB is configured such that the servo beam SVB is focused on the servo layer 9 without aberration at its wavelength.

The servo beam SVB passes through the wavelength-selective reflective film 5 and reaches the servo layer 9 and is reflected by the servo layer 9.

Figure 24:
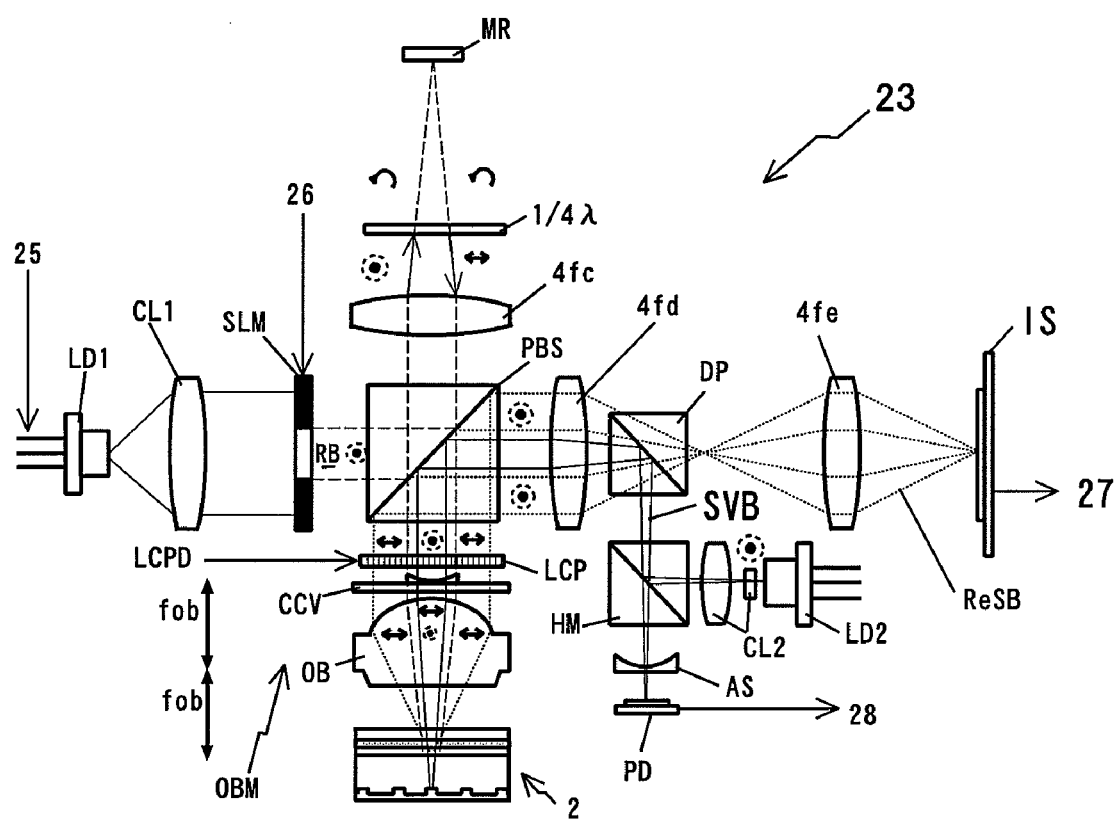
FIG. 24 is a sectional view showing schematically the hologram recording medium and the object lens module of the pickup of the hologram apparatus recording and reproducing information into and from the hologram recording medium according to the embodiment of the present invention.

The servo beam SVB reflected by the servo layer 9 and going back through the object lens module OBM, as shown in FIG. 24, travels from the polarizing beam splitter PBS to the dichroic prism DP along the same optical path as was taken when coming in to reach the half mirror MR and is incident on the photo-detector PD via a servo signal generating optical system.

In the photo-detector PD, a focus servo signal can be obtained according to an astigmatic method using, e.g., a cylindrical lens, and a tracking error signal according to a push-pull method or the like can be obtained by reading in the servo marks T formed on the servo layer 9. Further, address data formed by pit series or the like can be read in, and the pattern and location of the positioning mark are determined based on the address data.

As such, the servo control is performed by focusing the servo beam SVB on a track of the servo layer 9 to form a light spot via the object lens module OBM, and leading the reflected beam to the photo-detector PD, and driving the object lens module OBM by an actuator of the object lens driving unit 36 according to the signals detected by the photo-detector PD.

Because the wavelength-selective reflective film 5 is located on the object lens OB side (irradiation side) of the servo layer 9 as shown in FIG. 23, the signal light and reference light are reflected, and hence diffracted light of the signal light and reference light due to the servo structures (servo marks T) of the servo layer 9 does not occur. Thus, the influence of diffracted light is reduced enabling hologram reproduction with a good signal noise (S/N) ratio.

The each-time operation of the recording and reproducing by the present embodiment of FIG. 22 is as follows.

The emitted light from the laser source LD1 is made by the collimator lens CL1 to be parallel ray light, which is incident on the spatial light modulator SLM and then on the polarizing beam splitter PBS. When recording, the spatial light modulator SLM that displays page data to be recorded in its annular area and leaves a ray bundle passing through the center area non-modulated, divides the parallel ray light into the reference light RB and signal light SB, which are reflected by the polarizing beam splitter PBS, pass through the quarter-wavelength plate 1/4λ, are reflected by the mirror MR, and return to the polarizing beam splitter PBS to pass through it. The reference light RB and signal light SB transmitted are incident on the polarizing liquid crystal panel LCP.

When recording, by applying the same voltage to the transparent electrodes of the center polarizing area PLCCR and the annular polarizing area PLCP of the polarizing liquid crystal panel LCP shown in FIG. 23, they are put in an ON state. Thus the polarizing liquid crystal panel LCP does not perform polarization, and the signal light SB and reference light RB passing through it are not subjected to polarization, and thus their polarization direction (horizontal in the plane of the page) does not change.

The signal light SB and reference light RB having passed through the polarizing liquid crystal panel LCP and having the same polarization direction are incident on the object lens module OBM. The signal light SB is not subjected to the action of the concave lens element CCV and hence is focused on the original focal point of the object lens OB. The reference light RB is subjected to the action of the concave lens element CCV and hence is focused further than that focal point.

The wavelength-selective reflective film 5 of the hologram recording medium 2 is set to reflect a beam of the wavelength of the recording and reproducing laser, and hence the signal light SB is focused on and reflected by the wavelength-selective reflective film 5. Meanwhile, the reference light RB is defocused on and reflected by the wavelength-selective reflective film 5. An area occurs where the signal light SB and the incoming reference light RB intersect, and in this area the reference light RB and the signal light SB interfere with each other. The hologram recording layer 7 is placed to include this area (located on the object lens side of the focal point of the signal light SB, which is an overlapping area of the incoming reference light RB and signal light SB), and thus holograms are recorded in the hologram recording layer 7.

When reproducing, as shown in FIG. 24, the spatial light modulator SLM blocks the emitted light from the laser source LD1 in the annular area and allows the ray bundle in the center area including the optical axis to pass through non-modulated to produce the reference light RB. The reference light RB is made to travel along the same optical path as is taken when recording to reach the center polarizing area PLCCR of the polarizing liquid crystal panel LCP. Here, the annular polarizing area PLCPR of the polarizing liquid crystal panel LCP is put in an OFF state (without voltage application), and the center polarizing area PLCCR is left in the ON state. The reference light RB with the polarization direction horizontal in the plane of the page is incident on the hologram recording layer 7, and hence reproduced light ReSB is a ray bundle diverging and converging in the same way as the signal light when recording and having the polarization direction horizontal in the plane. Thus, since the reproduced light passes through the annular polarizing area PLCPR of the polarizing liquid crystal panel LCP, the polarization direction thereof becomes perpendicular to the plane of the page due to polarization. Meanwhile, the reference light RB with the polarization direction horizontal in the plane is reflected by the wavelength-selective reflective film 5 and is not subjected to polarization in the liquid crystal panel, resulting in being different in polarization direction from the reproduced light. Thus, while the reproduced light is reflected by the polarizing beam splitter PBS because its polarization direction is perpendicular to the plane of the page, the reference light RB passes through it. The separated reproduced light is imaged through the detecting system 4f lenses fd, fe on the photoreception surface of the image sensor IS, thereby obtaining a reproduced image. The image sensor IS outputs a reproduced signal.

As described above, the reference light RB reflected by the wavelength-selective reflective film 5 and the reproduced light are different in polarization direction and hence can be separated by the polarizing beam splitter PBS or the like. Thus, because the reference light RB is not incident on the photo-detector receiving the reproduced light, the S/N ratio in reproduction is improved.

As such, while in the conventional art the reference light for hologram recording is parallel ray light, in the present embodiment the particular object lens module makes the signal light and the reference light diverge or converge in such a way that their focal positions are different, and the polarized states are switched between when recording and when reproducing by means of a particular polarization plane rotating device such as the polarizing liquid crystal panel. Further, in the object lens module OBM, a particular optical element is configured, in cooperation with the object lens, to make a servo beam having a wavelength different from the recording and reproducing laser wavelength focused on the servo layer of the hologram recording medium without aberration.

<Recording Step>

Figure 25:
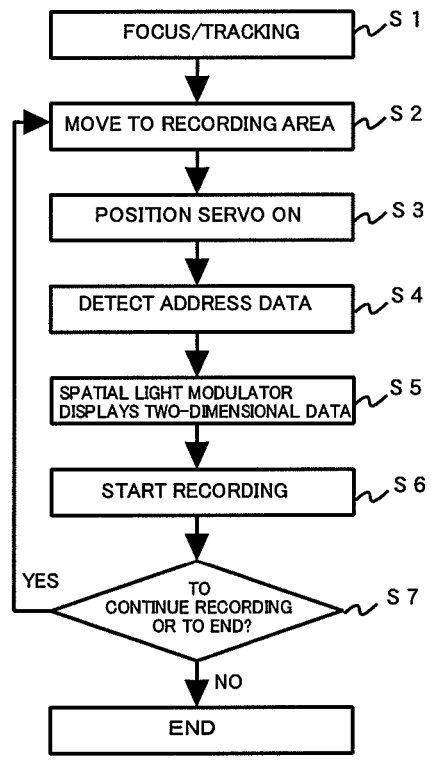
FIG. 25 is a flow chart showing the recording step for holograms according to the embodiment of the present invention.

The recording step for holograms is performed according to, e.g., the flow chart of FIG. 25.

First, after a hologram recording medium is mounted in the apparatus, focusing and tracking (zx-direction) servo and spindle servo are made to operate obtaining servo mark position information of the hologram recording medium (step S1), and the pickup is moved so that the focal point of the object lens is at a given position in a recording area (step S2).

Next, position servo (y-direction) is made to operate so as to make the light beam stay still relative to the recording layer 7 (step S3).

Then, address data is detected by means of the servo beam (step S4).

Next, the spatial light modulator displays two-dimensional data having modulated data to be recorded in its data area and in addition the positioning mark at a predetermined position (step S5).

Then, the output of the laser light is increased, and the signal light and the reference light are irradiated into the hologram recording medium to start hologram recording (step S6).

It is determined whether to continue recording two-dimensional data or to end (step S7). If the answer is to continue (yes), the process returns to step S2, and if the answer is to end (no), the process ends.

<Reproducing Step>

Figure 26:
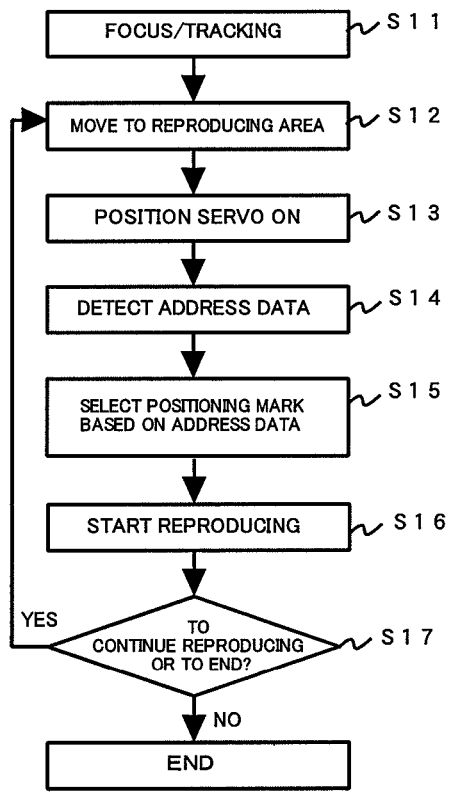
FIG. 26 is a flow chart showing the reproducing step for holograms according to the embodiment of the present invention.

The reproducing of holograms is performed according to the flow chart of FIG. 26.

First, after a hologram recording medium is mounted in the apparatus, focusing and tracking (zx-direction) servo and spindle servo are made to operate obtaining servo mark position information of the hologram recording medium (step S11), and the pickup is moved so that the focal point of the object lens is at a given position in a reproducing area (step S12).

Next, position servo (y-direction) is made to operate so as to make the light beam stay still relative to the recording layer 7 (step S13).

Then, address data is detected by means of the servo beam (step S14).

Next, a corresponding positioning mark is selected from memory based on the address data (identification data) for pattern matching (step S15).

Then, the output of the laser light is increased, and only the reference light is irradiated into the hologram recording medium to start hologram reproducing (step S16).

It is determined whether to continue reproducing two-dimensional data or to end (step S17). If the answer is to continue (yes)), the process returns to step S12, and if the answer is to end (no), the process ends.

<Case of an Angle Multiplexing Scheme>

Figure 27:
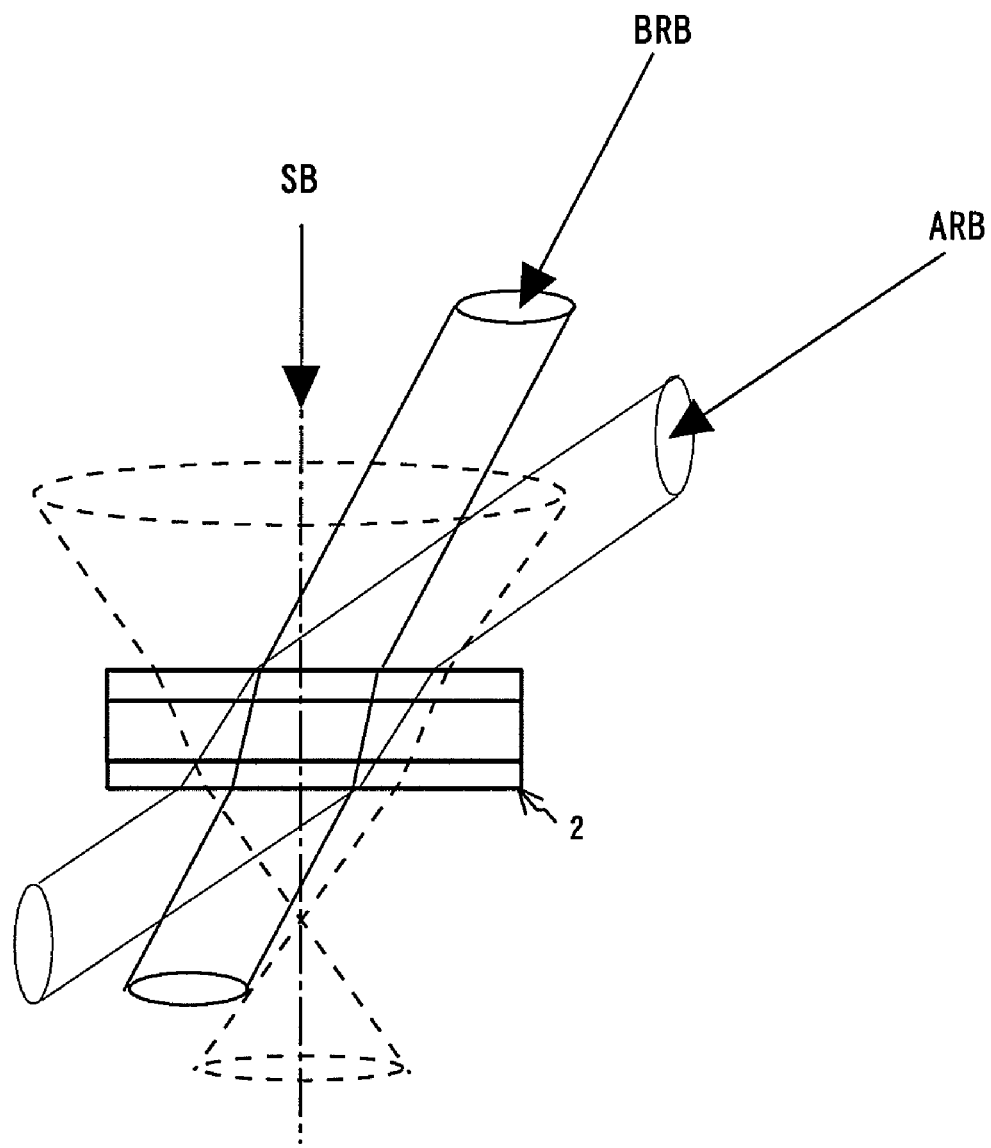
FIG. 27 is a sectional view showing a hologram recording medium in a hologram apparatus of an angle multiplexing scheme.

The present invention is also applicable to a hologram apparatus of an angle multiplexing scheme. A plurality of holograms can be recorded in the same area of a hologram recording medium 2 mounted in the hologram apparatus of the angle multiplexing scheme shown in, e.g., FIG. 27 by changing the relative angle between the reference light and the signal light. For example, holograms by the signal light SB and reference light ARB of an incident angle A and reference light BRB of an incident angle B can be recorded. The positioning mark of the angle multiplexing scheme of the present embodiment may be changed using data wherein the shape and location of the positioning mark differs depending on the angle of the reference light, or data wherein the shape and location of the positioning mark differs depending on the hologram recording area, or a combination thereof in addition to the identification data used in the above embodiment. The angle multiplexing scheme is the same in action and effect as the above embodiment.

The invention claimed is:

1. A recording method of optically recording two-dimensional data including a positioning mark for pattern matching and data area in a recording medium, said recording method comprising:
   a plurality of recording steps;
   wherein, in said plurality of recording steps, a state of said positioning mark is changed from a first state to at least one second state different from said first state every given number of recording times of such two-dimensional data,
   wherein identification data is recorded which includes information that the state of said positioning mark was changed from said first state to said second state every said given number of recording times of the two-dimensional data and
   wherein, in each of said recording steps, arbitrary data in said data area together with said positioning mark is recorded.

2. A recording method according to claim 1, wherein said identification data is recorded in said recording medium.

3. A recording method according to claim 1, wherein said first state and second state of said positioning mark are inverted in negative and positive from each other.

4. A recording method according to claim 1, wherein said first state and second state of said positioning mark are different in shape from each other.

5. A recording method according to claim 1, wherein said first state and second state of said positioning mark are the same in average brightness.

6. A recording method according to claim 1, wherein said first state and second state of said positioning mark are similar but different in size.

7. A recording method according to claim 1, wherein said first state and second state of said positioning mark are located at different locations respectively.

8. A recording method according to claim 1, wherein said first state and second state of said positioning mark are the same in shape and located at different locations respectively.

9. A recording method according to claim 1, wherein said data area and said positioning mark are the same in average brightness.

10. A recording method according to claim 1, wherein said identification data includes timing data indicating said given number of times.

11. A recording method according to claim 1, wherein said identification data includes form data indicating said first state and second state of said positioning mark.

12. A recording method according to claim 1, wherein said identification data includes form data indicating said first state and second state of said positioning mark and timing data indicating said given number of times for which said first state and second state of said positioning mark are the same in average brightness.

13. A reproducing method of optically reproducing two-dimensional data including a positioning mark and data area from a recording medium recorded in according to the recording method of claim 1, said reproducing method comprising a plurality of reproducing steps, wherein in said plurality of reproducing steps, the state of said positioning mark is changed from a first state to at least one second state different from said first state every equal number of reproducing times to said given number of recording times of the two-dimensional data, and in each of said reproducing steps, pattern matching is performed.

14. A reproducing method according to claim 13, wherein identification data including the information that the state of said positioning mark was changed from a first state to at least one second state different from said first state every given number of recording times of the two-dimensional data is read in, and the state of said positioning mark is changed from the first state to the at least one second state different from said first state every said equal number of reproducing times of the two-dimensional data according to said identification data.

15. A recording apparatus of performing the recording method of claim 1, thereby optically recording two-dimensional data including a positioning mark for pattern matching and data area in a recording medium, said recording apparatus comprising:
   a recording optical system to change the state of said positioning mark from a first state to at least one second state different from said first state every given number of recording times of such two-dimensional data in a plurality of recording steps; and
   a recording control circuit to control said recording optical system,
   wherein said recording optical system records identification data including the information that the state of said positioning mark was changed from said first state to said second state every said given number of recording times of the two-dimensional data, and
   wherein in each of said plurality of recording steps, arbitrary data in said data area together with said positioning mark is recorded.

16. A reproducing apparatus of performing the reproducing method of claim 13 or 14, thereby optically reproducing two-dimensional data including a positioning mark and data area from a recording medium, said reproducing apparatus comprising:
   a reproducing optical system to change the state of said positioning mark from a first state to at least one second state different from said first state every equal number of reproducing times to said given number of recording times of the two-dimensional data in a plurality of reproducing steps and to perform pattern matching in each of said plurality of reproducing steps; and a reproducing control circuit to control said reproducing optical system.

17. A reproducing apparatus according to claim 16, wherein said reproducing optical system reads in identification data including the information that the state of said positioning mark was changed from a first state to at least one second state different from said first state every given number of recording times of the two-dimensional data and changes the state of said positioning mark from the first state to the at least one second state different from said first state every said equal number of reproducing times of the two-dimensional data according to said identification data.

18. A recording medium which two-dimensional data including a positioning mark for pattern matching and data area is optically recorded in according to the recording method of claim 1 and reproduced from, wherein arbitrary data in said data area together with said positioning mark is recorded, said positioning mark changing from a first state to at least one second state different from said first state every equal number of reproducing times to said given number of recording times of the two-dimensional data, and wherein identification data is recorded which includes the information that the state of said positioning mark was changed from said first state to said second state every said given number of recording times of the two-dimensional data.

19. A recording medium according to claim 18, which is made of a photosensitive material to record wave fronts of light carrying information volumetrically as change in the index of refraction.

* * * * *